June 11, 1935. J. B. STICKLE 2,004,227
STEAM HEATING APPARATUS
Filed Jan. 24, 1930
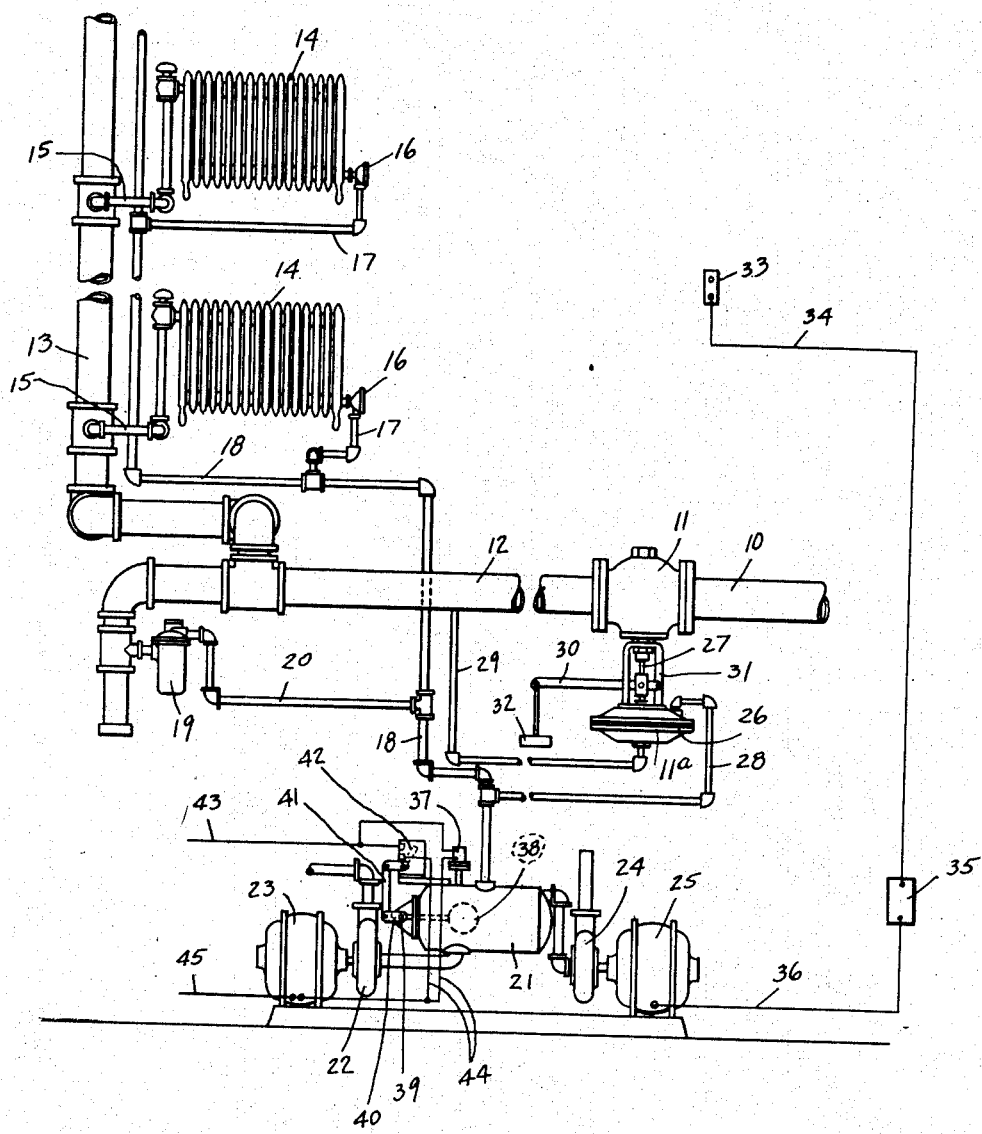
INVENTOR.
JOHN B. STICKLE.
BY
Lockwood Lockwood Goldsmith & Gall
ATTORNEYS.

Patented June 11, 1935

2,004,227

UNITED STATES PATENT OFFICE 2,004,227

STEAM HEATING APPARATUS

John B. Stickle, Indianapolis, Ind.

Application January 24, 1930, Serial No. 423,007

6 Claims. (Cl. 237—9)

This invention relates to steam heating apparatus and more particularly to steam heating apparatus which may be controlled in response to weather conditions.

The present application is a continuance in part of application Serial No. 349,711, filed March 25, 1929.

The object of the invention is to provide a steam heating apparatus particularly for large buildings wherein the heat supply may be regulated according to weather conditions to give more heating comfort with a maximum efficiency of steam consumption and fuel consumption.

Heretofore a common method of control of steam heating has been by direct control of the steam pressure or "heating pressure" in the pipe lines supplying steam to the radiating surfaces. This steam pressure is usually maintained above atmospheric pressure. By reducing heating pressure considerably below atmospheric pressure when heating requirements are not severe, important savings in steam consumption may be made since the temperature of steam decreases rapidly with a decrease in absolute pressure and since the radiation from the heating surface is directly proportional to the temperature difference between the steam therein and the room to be heated. When weather conditions are not severe, the steam for heating may be supplied at a pressure greatly below atmospheric pressure with the same degree of heating comfort obtained with severe weather conditions and steam pressures above atmospheric pressure.

The principal feature of this invention resides in the provision of apparatus for automatically maintaining a predetermined pressure difference between the steam supply and the condensate return and for varying the return line vacuum with variation of heating requirements, thereby also varying the heating pressure or vacuum. Thus the proper pressure difference for drainage is automatically maintained and the two pressures varied at the same time. The circulation will then be satisfactory regardless of whether both pressures are above atmospheric pressure, both below atmospheric pressure or one above and one below. The auxiliary power expense will be no greater than necessary at any given time and accidental loss of vacuum cannot stop radiator drainage. In mild weather, the highest possible vacuum the pump will produce automatically gives the lowest possible heating pressure for greatest economy and at the same time positively maintains the proper pressure differential for drainage. The variation of return line vacuum may be accomplished manually or may be automatically responsive to either outdoor temperature, indoor temperature or both. Thus, the control of heating temperature is obtained by control of the return line vacuum as distinguished from previous methods of direct control of heating pressure.

Other features of the invention and the full nature thereof will be apparent from the accompanying drawing and the following description and claims.

The drawing is a diagrammatic representation of a preferred form of apparatus embodying the invention.

A steam header 10 is adapted to conduct steam from a boiler or other source of steam supply not shown in the drawing. Steam flow control mechanism, consisting of a valve 11, a differential controller 11a and pipe connections 28 and 29, controls the flow of steam from header 10 to a heating main 12, said mechanism being described in more detail hereinafter. The heating main 12 is herein illustrated as having an upwardly extending portion 13. A plurality of heating elements or radiators 14 are connected to the upwardly extending main 13 by means of pipes 15, and are thereby supplied with steam for heating purposes. Each of the heating elements 14 is fitted with a steam trap 16 to which is connected a condensate return line 17 leading to a return main 18 for the removal of condensate from the heating elements. The heating main 12 is also furnished with a steam trap 19 for removing condensate therefrom and returning the same to the condensate return main 18 by means of a pipe 20.

The condensate return line 18 discharges the condensate into a tank 21 from which it is removed by means of a condensate pump 22 operated by a motor 23. Air or uncondensed vapor is also drawn from the tank 21 by means of a dry vacuum pump 24 driven by a motor 25.

The regulating valve 11 is fitted with a controller 11a having a housing 26 which is divided into upper and lower chambers by means of a common form of flexible diaphragm. A valve stem 27 is attached to the said diaphragm and is adapted to operate the valve 11 for controlling the passage of steam therethrough in response to movements of the said diaphragm. The chamber in the housing 26 above the diaphragm is connected by means of a pipe 28 with the condensate return line 18. The chamber beneath the diaphragm is connected to the heating main 12 by means of a pipe 29. The diaphragm, therefore, tends to move upwardly or downwardly, depending upon the difference between the pressures in the heating main and return line.

A lever 30 is pivotally connected to the stem 27 and is pivotally mounted upon a frame member 31 which forms a portion of the support for the housing 26. A weight 32 is hung upon the end of the lever 30. The said weight, therefore, tends to move the stem 27 downward to counterbalance the difference in pressure between heating main 12 and return line 18. The said weight is adjusted so that the diaphragm will be moved upwardly if the pressure in the heating main 12 exceeds the pressure in the vacuum return line 18 by more than a predetermined amount. This upward motion serves to reduce the opening of the valve 11, thereby reducing the pressure in the heating main 12 and bringing the said pressure difference back to the predetermined amount.

Similarly, if the pressure difference is less than the predetermined amount, the stem 27 will be moved downwardly and more steam will be allowed to pass through valve 11 to increase the pressure in the heating main. By means of this construction, any variation in the vacuum maintained in the condensate return line will automatically result in an increase or decrease in the pressure or vacuum in the heating main 12 of exactly the proper degree to maintain the predetermined pressure difference. As an example, if the weights 32 are adjusted for a pressure difference of 2 pounds per square inch or 4 inches mercury, the heating pressure will always be 2 pounds above atmospheric pressure if the condensate return line is maintained at atmospheric pressure but the heating pressure will be reduced to an 18-inch vacuum if the condensate return line is reduced to a 22-inch vacuum. When there is 2 pounds pressure in the radiators 14 there is an internal radiator temperature of approximately 218.5 degrees Fahrenheit. When there is a vacuum of 18 inches inside the radiators 14 there is an internal radiator temperature of 169 degrees Fahrenheit. A decided difference in the amount of heat transferred from the radiator occurs under the two conditions noted, resulting in automatic temperature control.

For controlling the return line vacuum, a thermostatic system is preferably provided. Herein a thermostat 33 is illustrated which may be located at any desired position inside or outside of a building, and which is connected by means of a cable 34 to a controller 35 for the motor 25. The aforesaid controller is connected by a cable 36 to the said motor. By means of this connection, the thermostat may be set to close a circuit for starting the motor when the temperature is above a predetermined degree. When this degree has been reached and the motor started, the dry air pump 24 will be operated at the proper speed to increase the vacuum in the condensate return line to a desired point. This increase in the vacuum in return line 18 automatically results in a decrease in pressure or in increase in vacuum in the heating main 12. At the lower pressure thus produced, the steam temperature in the heating elements 14 is reduced and the heat radiation therefrom is accordingly decreased.

When the temperature controlling the thermostat falls below the said predetermined value, the pump 24 and motor 25 will be stopped. Under these conditions, a pressure sensitive controller 37 operates to start the motor 23 and the pump 22 when the vacuum in the condensate tank 21 has decreased to a predetermined point. Thus when heating requirements are severe, only the pump 22 is operated and the said pump is operated only sufficiently to maintain a predetermined low vacuum in the return line 18.

When this low vacuum is maintained the heating pressure is automatically increased, preferably to a point above atmospheric pressure, and a correspondingly greater radiation is obtained from the heating elements to meet the requirements of the lowered temperature at the thermostat, resulting in automatic temperature control.

For removal of the condensate from the tank 21 independently of the pressure therein a float 38 is provided within the tank, pivotally mounted upon a portion of the tank housing by means of a pin 39. The said pin has a link 40 attached thereto, to which is connected a link 41 operating an electric switch 42. The said switch is connected to a power supply line 43 which is also connected to the switch 37. The opposite terminals of both of said switches are connected by lines 44 to the motor 23, which is in turn connected to a power line 45. Thus the switches 37 and 42 are in parallel and the closing of either starts the operation of motor 23. When the condensate in tank 21 has reached a predetermined level, the float 38 is elevated to close the switch 42 for starting the motor 23 and pump 22. Thus, the condensate will be withdrawn from the tank 21 whether the pump 24 is operating or not and independently of the degree of vacuum in the said tank.

Variations from the exact apparatus herein described are possible without departing from the broader aspect of the invention as defined in the following claims. The word "pressure" as used in the claims indicates pressure above or below atmospheric pressure.

The invention is equally applicable to the single pipe heating system in which the condensate is drained from the radiators through the steam main, as disclosed in my copending application Serial No. 378,128, filed July 13, 1929. In the claims the terms "condensate return line" and "return line" are intended to include a line receiving condensate from the radiators via the steam main as well as one receiving condensate direct from the radiator.

The invention claimed is:

1. A steam heating apparatus including a heat radiator, a steam supply pipe for supplying steam to said radiator, a return line receiving condensate drained from said radiator, a vacuum producing device connected to said return line, a thermostat located in a region whose temperature is indicative of the heating requirements of the system, means controlled by said thermostat and operating said vacuum producing device to increase the vacuum in said return line in response to a temperature increase at said thermostat and to decrease said vacuum in response to a temperature decrease at said thermostat, a valve in said steam supply line, and a differential controller connected to said steam supply pipe and to said return line and operating said valve to throttle steam flow in said steam supply pipe in response to an increase of vacuum in said return line and to increase said steam flow in response to a decrease of vacuum in said return pipe.

2. A steam heating apparatus including a heat radiator, a steam supply pipe for supplying steam to said radiator, a return line receiving condensate drained from said radiator, a vacuum producing device connected to said return line, a thermostat located in a region whose temperature is indicative of the heating requirements of the system, means controlled by said thermostat and operating said vacuum producing device to increase the vacuum in said return line in response to a temperature increase at said thermostat and to decrease said vacuum in response to a temperature decrease at said thermostat, a valve in said steam supply line, and a differential controller connected to said steam supply pipe and to said return line and operating said valve to throttle steam flow in said steam supply pipe in response to an increase of vacuum in said return line and to increase said steam flow in response to a decrease of vacuum in said return pipe, said controller being biased to maintain a substantially constant difference between the pressure in said supply pipe and the vacuum in said return line.

3. A steam heating apparatus including a heat radiator, a steam supply pipe for supplying steam to said radiator, a return line receiving condensate drained from said radiator, a pressure reducing device connected to said return line, a thermostat located in a region whose temperature is indicative of the heating requirements of the system, means controlled by said thermostat and operating said pressure reducing device to reduce the pressure in said return line in response to a temperature increase at said thermostat and to increase said pressure in response to a temperature decrease at said thermostat, a valve in said steam supply line, and a differential controller connected to said steam supply pipe and to said return pipe and operating said valve to throttle steam flow in said steam supply pipe in response to a decrease of pressure in said return pipe and to increase said steam flow in response to an increase in pressure in said return pipe.

4. A steam heating apparatus including a heat radiator, a steam supply pipe for supplying steam to said radiator, a return line receiving condensate drained from said radiator, a pressure reducing device connected to said return line, a thermostat located in a region whose temperature is indicative of the heating requirements of the system, means controlled by said thermostat and operating said pressure reducing device to reduce the pressure in said return line in response to a temperature increase at said thermostat and to increase said pressure in response to a temperature decrease at said thermostat, a valve in said steam supply line, and a differential controller connected to said steam supply pipe and to said return pipe and operating said valve to throttle steam flow in said steam supply pipe in response to a decrease of pressure in said return pipe and to increase said steam flow in response to an increase in pressure in said return pipe, said controller being biased to maintain a substantially constant difference between the pressures in said supply pipe and return pipe.

5. A method of controlling the heating effect of a steam heating system having a steam supply pipe and a return pipe, consisting in automatically increasing and decreasing the pressure in said return pipe in response to increase and decrease of heating requirements, and automatically increasing and decreasing the steam supply pressure in response to increase and decrease in return pipe pressure to maintain a sufficient pressure difference therebetween for adequate drainage.

6. A method of controlling the heating effect of a steam heating system having a steam supply pipe and a return pipe, consisting in automatically increasing and decreasing the pressure in said return pipe in response to increase and decrease of heating requirements, and automatically increasing and decreasing the steam supply pressure in response to increase and decrease in return pipe pressure to maintain a substantially constant pressure difference therebetween.

JOHN B. STICKLE.